(12) United States Patent
Sass et al.

(10) Patent No.: US 12,172,601 B2
(45) Date of Patent: Dec. 24, 2024

(54) ACCESS SYSTEM AND ACCESS VERIFICATION METHOD

(71) Applicant: Continental Automotive Technologies GmbH, Hannover (DE)

(72) Inventors: Dieter Sass, Regensburg (DE); Herbert Froitzheim, Pettendorf (DE)

(73) Assignee: Continental Automotive Technologies GmbH, Hannover (DE)

( * ) Notice: Subject to any disclaimer, the term of this patent is extended or adjusted under 35 U.S.C. 154(b) by 211 days.

(21) Appl. No.: 17/928,986

(22) PCT Filed: May 31, 2021

(86) PCT No.: PCT/DE2021/200072
§ 371 (c)(1),
(2) Date: Dec. 1, 2022

(87) PCT Pub. No.: WO2021/244712
PCT Pub. Date: Dec. 9, 2021

(65) Prior Publication Data
US 2023/0219523 A1     Jul. 13, 2023

(30) Foreign Application Priority Data
Jun. 5, 2020 (DE) .................. 10 2020 207 097.0

(51) Int. Cl.
*B60R 25/24* (2013.01)
*G07C 9/00* (2020.01)

(52) U.S. Cl.
CPC ........ *B60R 25/241* (2013.01); *G07C 9/00309* (2013.01)

(58) Field of Classification Search
CPC ..... B60R 25/24; B60R 25/241; B60R 25/243; B60R 25/245; G07C 9/00
See application file for complete search history.

(56) References Cited

U.S. PATENT DOCUMENTS

| 2013/0288659 A1 | 10/2013 | Hrabak |
| 2016/0225203 A1* | 8/2016 | Asmar ............... G07C 9/00309 |

(Continued)

FOREIGN PATENT DOCUMENTS

| DE | 102018131371 A1 | 3/2020 |
| EP | 1873722 A1 | 1/2008 |
| JP | 2015059396 A | 3/2015 |

OTHER PUBLICATIONS

Office Action dated Dec. 18, 2020 from corresponding German patent application No. 10 2020 207 097.0.

(Continued)

*Primary Examiner* — Tan Q Nguyen

(57) ABSTRACT

An access system comprises a control unit in a vehicle, and a portable electronic device comprising a battery and a switch or a button. The portable electronic device comprises a transponder unit wirelessly supplied with power by the control unit. The control unit transmits a request signal to the portable electronic device. The portable electronic device checks, upon receipt of the request signal, whether supplying power by the battery is possible, provides wireless power supply by the control unit to the transponder unit, transmits a response signal to the control unit when supplying power by the battery is not possible, and when supplying power by the battery is possible and the switch or button was actuated within a specific time period around the receipt of the request signal. The vehicle is unlocked if the portable electronic device is recognized as belonging to the vehicle based on the response signal.

20 Claims, 3 Drawing Sheets

(56) References Cited

U.S. PATENT DOCUMENTS

Figure 1:
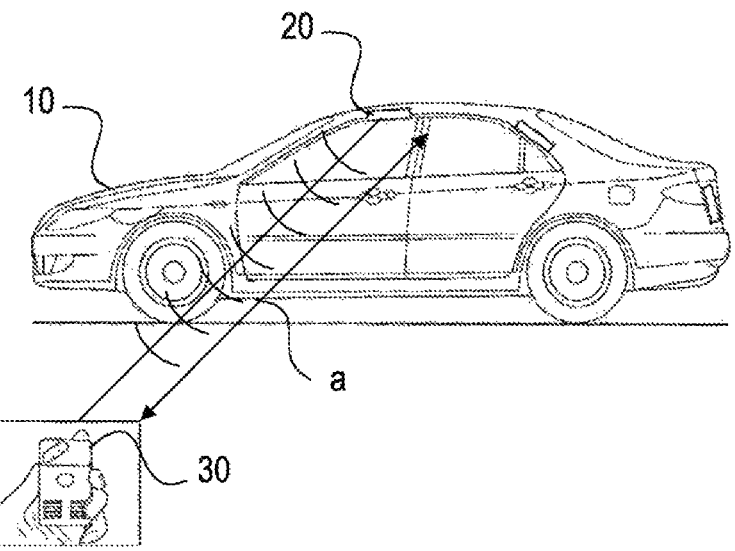

2017/0004664 A1\* 1/2017 Yamamoto ......... G07C 9/00309
2018/0154866 A1\* 6/2018 Sute ....................... H02J 50/12

OTHER PUBLICATIONS

International Search Report and Written Opinion dated Sep. 2, 2021 from corresponding International patent application No. PCT/DE2021/200072.

\* cited by examiner

ACCESS SYSTEM AND ACCESS VERIFICATION METHOD

The invention relates to an access system and to an access verification method, in particular in a vehicle.

Keyless vehicle access and start systems, such as, for example, the passive entry passive start (PEPS) system, are automatic systems for unlocking a vehicle without actively using a car key and for starting simply by actuating the start button. An emission unit, which emits signals, is arranged in the vehicle. The signals are, for example, electromagnetic signals in the LF (low frequency) or HF (high frequency) range. These signals are received by a portable electronic receiving unit, if the portable electronic receiving unit is located in the proximity of the vehicle, and subsequently evaluated and/or further processed. Subsequent to the evaluation and/or further processing in the portable electronic receiving unit, appropriate response signals can be sent back to the emission unit in the vehicle. The response signals are sent, for example, in the UHF frequency range and can be evaluated in the vehicle by an evaluation unit. If a response signal is recognized as correct and, thus, the portable electronic receiving unit is recognized as belonging to the vehicle, the vehicle can be unlocked.

A portable electronic receiving unit for a keyless vehicle access and start system generally includes a transponder unit, which, as a back-up function, receives, evaluates, and further processes signals from the emission unit of the vehicle and transmits response signals to the vehicle in the LF frequency range over a short distance, because, for example, the UHF frequency range is interfered with or because the battery supply of the portable electronic receiving unit is not present.

Such systems can be relatively easily attacked, however, for example, by relay attacks.

Systems that function according to the "charge & talk" principle can also be easily attacked by relay attacks. In charge & talk systems, a transponder unit is supplied with power by an electromagnetic field generated by the vehicle and can send signals to the vehicle only for as long as the power supply is ensured.

Vehicle access systems, in which data are transmitted from the transponder unit to the vehicle by means of load modulation, are less susceptible to relay attacks but have only an extremely limited range.

The problem addressed by the invention is to provide an access system and a corresponding method for access verification, which have a slightly greater range than comparable systems and are simultaneously reliably protected against relay attacks.

This problem is solved by an access system according to claim 1, a method according to claim 8, and a vehicle according to claim 9.

The access system according to the invention includes a control unit arranged in a vehicle, and a portable electronic device, wherein the portable electronic device includes a battery, which is designed to supply power to various further components of the portable electronic device; the portable electronic device includes a transponder unit, which can be wirelessly supplied with power by the control unit; the control unit is designed to send a request signal to the portable electronic device; the portable electronic device is designed to check, upon receipt of a request signal, whether a power supply by the battery is possible; the portable electronic device is also designed to provide a wireless power supply to the transponder unit by the control unit and to send a response signal to the control unit for the case in which a power supply by the battery is not possible; and the portable electronic device is also designed to send a response signal to the control unit for the case in which a power supply by the battery is possible and a switch or a button of the electronic device has been actuated by a user within a specific time period before or after the receipt of the request signal, wherein the vehicle is unlocked if the electronic device is recognized on the basis of the response signal as belonging to the vehicle.

If the battery is sufficiently charged, the access system is therefore protected against unwanted attacks, such as, for example, relay attacks.

The vehicle can remain locked if the control unit does not receive a response signal or a valid response signal within a specific time period after the emission of a request signal from the portable electronic device.

As a result, the vehicle can be prevented from being unlocked by devices that are unauthorized or that do not belong to the vehicle.

The control unit can emit request signals, for example, either at regular intervals or only in response to a triggering event.

As a result, a keyless access to the vehicle can be ensured.

The triggering event can include the actuation of a door handle of the vehicle or the detection of an approach by the electronic device to the vehicle.

If request signals are emitted only for the case in which an approach by the user to the vehicle is detected, energy can be conserved as compared to systems that continuously emit request signals.

The specific time period before or after the receipt of the request signal can be, for example, a few seconds or a few minutes.

This enables the user to release the function of the electronic device shortly before he/she actually approaches the vehicle, or to respond to a received request signal and indicate his/her desire to unlock the vehicle.

A supply of power by the battery can be possible if a state of charge of the battery exceeds a predefined limit value.

The electronic device can include either a vehicle key, a mobile phone, a smartphone, a tablet, a smartwatch, a laptop, or a personal digital assistant.

These are electronic devices that, in principle, can perform the function of a vehicle key.

Moreover, a method for access verification in a vehicle is described, wherein the vehicle has an access system that includes a control unit arranged in the vehicle, and a portable electronic device. The method includes emitting a request signal from the control unit to the portable electronic device; upon receipt of a request signal, checking by the electronic device whether a power supply by the battery is possible; if a power supply by the battery is not possible, providing a wireless power supply to the transponder unit by the control unit and sending a response signal from the electronic device to the control unit, and, if a power supply by the battery is possible and a switch or a button of the electronic device has been actuated by a user within a specific time period before or after the receipt of the request signal, supplying the transponder unit with power by means of the battery and sending a response signal from the electronic device to the control unit, and unlocking the vehicle if the electronic device is recognized on the basis of the response signal as belonging to the vehicle.

A vehicle has an access system that includes a control unit arranged in a vehicle, and a portable electronic device. The portable electronic device includes a battery, which is designed to supply various further components of the portable electronic device with power. The portable electronic device also includes a transponder unit, which can be wirelessly supplied with power by the control unit. The control unit is designed to send a request signal to the portable electronic device. The portable electronic device is designed to check, upon receipt of a request signal, whether a power supply by the battery is possible. The portable electronic device is also designed to provide a wireless power supply to the transponder unit by the control unit and to send a response signal to the control unit for the case in which a power supply by the battery is not possible. The portable electronic device is also designed to send a response signal to the control unit for the case in which a power supply by the battery is possible and a switch or a button of the electronic device has been actuated by a user within a specific time period before or after the receipt of the request signal. The vehicle is unlocked if the electronic device is recognized on the basis of the response signal as belonging to the vehicle.

Figure 2:
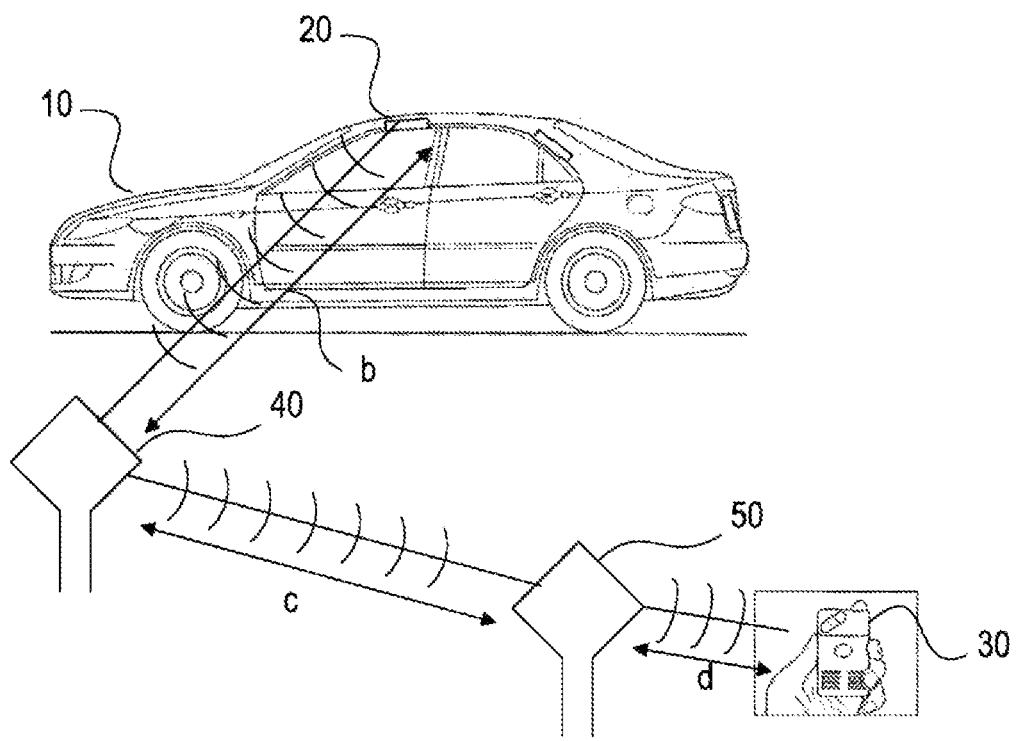
Figure 3:
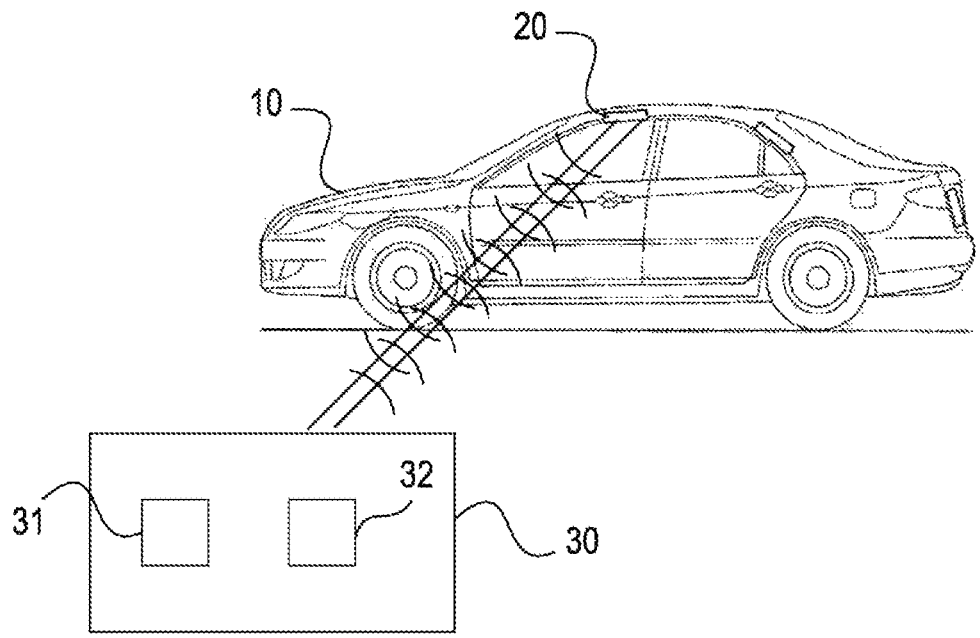
Figure 4:
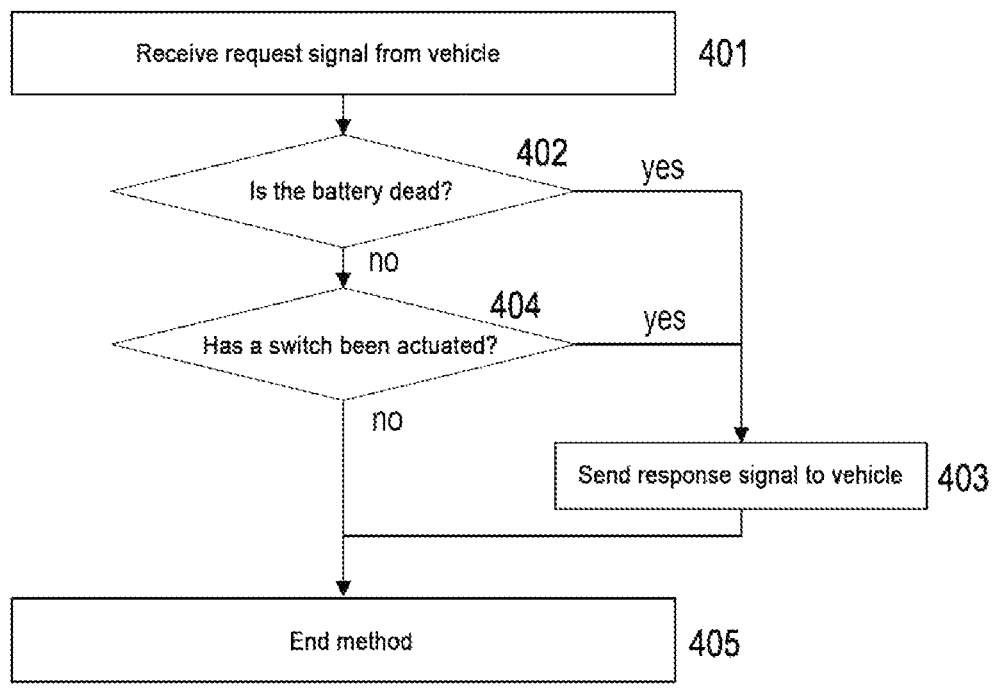
Figure 5:
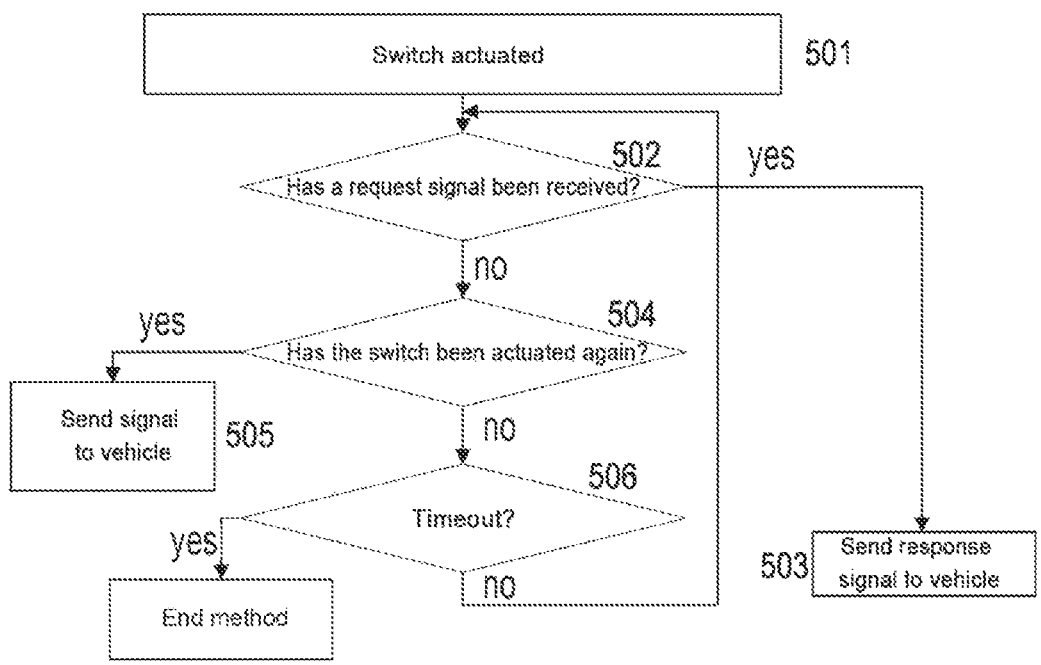

The invention is described in greater detail in the following with reference to the exemplary embodiments shown in the figures of the drawing. Wherein:

FIG. 1 shows, by way of example, a vehicle that includes an access system according to one embodiment of the invention, FIG. 2 shows a rough-draft representation of the principle of an attack on a keyless vehicle access and start system, FIG. 3 shows a rough-draft representation of an access system according to one embodiment of the invention, FIG. 4 shows, by way of example, a method according to one embodiment of the invention in a flow chart, and FIG. 5 shows, by way of example, a method according to another embodiment of the invention in a flow chart.

FIG. 1 shows a schematic representation of the basic principle of a device access verification in a vehicle 10. Arranged in the vehicle 10 is a control unit 20 that includes a transceiver (the transceiver is not explicitly represented), which is designed to emit signals. The signals are, for example, electromagnetic signals in the LF (low frequency) or HF (high frequency) range. These signals are received by an electronic device 30 if the electronic device 30 is located in the proximity of the control unit 20, and subsequently decoded, evaluated, and/or further processed in the electronic device 30. Subsequent to the evaluation and/or further processing in the electronic device 30, appropriate response signals can be sent back to the control unit 20. The response signals are sent, for example, in the UHF frequency range and can be evaluated in the vehicle 10 by an evaluation unit (not represented in FIG. 1). If the electronic device 30 is recognized as belonging to the vehicle 10, the vehicle 10 can be unlocked and started. If there is no correct response from the electronic device 30 within a defined time, however, nothing happens.

In order to receive the signals emitted from the control unit 20, the electronic device 30 must be located within a certain radius around the control unit 20. Depending on the communication standard that is used, this radius can be a few centimeters, for example, 10 cm, up to multiple meters. Therefore, in the case of short ranges, it can be necessary to hold the electronic device 30 in the proximity of the control unit 20 or to insert the electronic device 30 into a device intended therefor in the vehicle 10. As a result, it can be ensured that the electronic device 30 is located close enough to the control unit 20 and communication is possible.

The control unit 20 can emit signals continuously or only in response to a certain event. The current consumption of the control unit 20 during the emission of signals is generally relatively high. If signals are emitted only in response to a certain, triggering event, the current consumption can therefore be considerably reduced. Such a triggering event can be, for example, pulling on a door handle (to unlock the vehicle) or actuating a start button (to start the vehicle). This means, the control unit 20 emits one or multiple request signal(s) as soon as, for example, the door handle or a start button of the vehicle 10 has been actuated. If the electronic device 30 is located in the proximity of the control unit 20 and the control unit 20, upon receipt of a request signal, emits a correct response signal, the vehicle 10 can be unlocked and started. Devices are also known that detect the approach by a user by means of sensors, for example, by means of capacitive sensors in the door handle. Other devices detect, for example, the approach by a user when a communication link, for example, a Bluetooth link, is established between the electronic device 30 and the vehicle 10. The authorization process can then take place even before the user has actually actuated the door handle. Many further triggering events are also possible.

Such systems can be relatively easily attacked, however, for example, by relay attacks. In this case, a greater distance between the vehicle 10 and the electronic device 30 can be bridged by extending the radio link of the communication channel that is used (for example, a LF (low frequency) or HF (high frequency) communication channel), for example, by using two devices, one of which is located in the proximity of the vehicle 10 and the other of which is located in the proximity of the electronic device 30. In this way, a vehicle 10 can be opened and started even though the vehicle key (electronic device 30) is not located within the necessary range.

FIG. 2 shows a schematic representation of the principle of such a relay attack on a keyless vehicle access and start system by extending the radio link of a communication channel. In the representation shown in FIG. 2, the key including the electronic device 30 is located outside the range of the request signals emitted from the emission unit 20. A first device 40, which has an antenna, is located in the proximity of the vehicle 10, however, within the radius necessary for receiving the signals. The distance of the first device 40 to the emission unit 20 in the vehicle 10 is designated with b. A second device 50 that also has an antenna is located within the range of the electronic device 30. The distance of the second device 50 to the first device 40 is designated with c. The distance of the second device 50 to the electronic device 30 is designated with d.

The first device 40 in the proximity of the vehicle 10 receives the signals that are emitted from the control unit 20 and transmits these signals further to the second device 50. The signal is transmitted from the second device 50 to the electronic device 30. Amplifiers and transmission stages, for example, are necessary in the devices 40, 50 in order to be able to transmit the signals across a distance c between the first device 40 and the second device 50, which is usually considerably greater than the normal range of the frequently used LF or HF signals. With this arrangement, a theoretically arbitrarily long distance between the vehicle 10 and the electronic device 30 can therefore be bridged.

The signal is received, evaluated, and/or processed in the electronic device 30. The response signal emitted from the electronic device 30 can be transmitted back to the vehicle 10 via the same arrangement that includes the first device 40 and the second device 50. The evaluation electronics system arranged in the vehicle 10 therefore initially does not detect that the electronic device is not located within the range.

Although the electronic device 30 is not within the range, the vehicle 10 can still be opened and also started.

Without extending the range by means of an above-described arrangement, a vehicle 10 could, for example, also be opened and started without authorization if the electronic device 30 is located within the necessary range. This can be the case, for example, if the vehicle 10 is stopped in front of the house of a user and the electronic device 30 is located in the house at a point that is situated within the range. Opening the vehicle 10 in a case of this type, however, it is also often undesirable.

Various methods are known for preventing such attacks and an unauthorized opening and starting of the vehicle 10. Such methods are often complex, however, and often do not offer 100% reliable protection against relay attacks.

An example of an access system is now described with reference to FIG. 3. The access system includes a control unit 20 arranged in a vehicle 10, and a portable electronic device 30. The portable electronic device 30 includes a transponder unit 32 and a battery 31. The battery 31 can supply various components (not explicitly represented in FIG. 3) of the portable electronic device 30 with power. These can be, for example, components that are required for conventional passive access systems or RKE (remote keyless entry) systems. The transponder unit 32 is frequently provided as a back-up solution, for example, for the case in which the normally utilized passive access systems or RKE systems fail, for example, if the relevant components are defective or a power supply of the passive access systems or RKE systems by the battery 31 is not possible. The transponder unit 32 is generally wirelessly supplied with power by the control unit 20. A power supply by the battery 31 is not possible, for example, if the state of charge of the battery 31 has dropped below a certain value. For example, a supply by the battery 31 can no longer be ensured if the state of charge is less than 5%, wherein the battery 31 is fully charged at a state of charge of 100% and is fully discharged at a state of charge of 0%. A state of charge can be determined, for example, on the basis of the battery voltage. If the battery 31 is fully charged, the battery 31 has a certain voltage. If the battery 31 discharges, the battery voltage also decreases. If the battery voltage has dropped below a certain value, a power supply by the battery 31 can no longer be ensured.

A wireless supply of the transponder unit 32 with power is possible, for example, by means of inductive coupling of two inductors (antennas), one of which is arranged in the control unit 20 and the other of which is arranged in the electronic device, for example, in the transponder unit 32 (the antennas are not explicitly represented in FIG. 3). Such systems are frequently also referred to as charge & talk systems, since communication is possible only for the case in which power is provided by the communication partner (the control unit 20 in this case).

Such charge & talk systems are easily attackable, however, by above-described relay attacks.

The control unit 20 is designed to send a request signal to the portable electronic device 30. Request signals can be emitted either at regular intervals or in response to a triggering event. A triggering event can be, for example, the approach by the user to the vehicle 10 or the actuation of a door handle of the vehicle 10. In order to protect the access system against unwanted relay attacks, the portable electronic device 30 checks, upon receipt of a request signal, whether a power supply of the portable electronic device 30 by the battery 31 is possible. Therefore, for example, a state of charge of the battery 31 is checked. If a power supply by the battery 31 is not possible, a wireless power supply of the transponder unit 32 by the control unit 20 is permitted and a response signal is sent from the transponder unit 32 to the control unit 20. In a case of this type, further methods for detecting relay attacks could be carried out, for example, by the control unit 20 in the vehicle. Generally, however, an access to the vehicle 10 is ensured, i.e., the vehicle 10 is unlocked, if the electronic device 30 is recognized on the basis of the response signal as belonging to the vehicle 10.

If the portable electronic device 30 detects, however, that a power supply by the battery 31 is possible, a response signal to the vehicle 10 can be initially suppressed, in principle. In this case, it is necessary for a user to actuate a switch, a key, or a button of the electronic device 30 within a specific time period before or after the receipt of the request signal. By actuating the switch or the button, the user expresses his/her explicit desire to unlock the vehicle 10. If the electronic device 30 receives a request signal of a vehicle 10, the battery 31 is sufficiently charged, and the desire of the user to unlock the vehicle 10 is expressly detected, the transponder unit 32 can send a response signal to the control device 20. In this case as well, the vehicle 10 is unlocked if the electronic device 30 is recognized on the basis of the response signal as belonging to the vehicle 10.

In the described system, therefore, when the battery is sufficiently charged, a response signal from the electronic device 30 to the vehicle 10 remains suppressed for as long as a switch, a key, or a button of the electronic device 30 has not been actuated by the user. As a result, relay attacks can be effectively prevented for all cases in which sufficient power can be provided by the battery 31.

The portable electronic device 30 can be, for example, a vehicle key, a mobile phone, a smartphone, a tablet, a smartwatch, a laptop, or a personal digital assistant (PDA). Any other suitable portable electronic devices are also possible. A vehicle key can include, for example, appropriate switches or buttons. A smartphone can include, for example, a display on which appropriate buttons can be displayed to the user, for example, by means of a suitable app (application).

It can be necessary in this case, for example, that a user actuate the switch or the button within a specific time period before the receipt of the request signal in the electronic device 30. For example, upon leaving his/her house, a user can release the function of the transponder unit 32 by actuating the switch or the button. The specific time period can be, for example, a few seconds or also up to a few minutes. The user can actuate the switch or the button, for example, also for a specific time period after the receipt of the request signal. This time period can be, for example, a few seconds, for example, up to 30 seconds or up to 60 seconds.

An access verification method is described, by way of example, with reference to FIG. 4. Initially, a request signal can be sent from the control unit 20 to the electronic device 30 (step 401), for example, in response to a triggering event. The electronic device 30 can subsequently check the state of charge of the battery 31 (step 402). If the battery 31 is not sufficiently charged, a response signal can be sent to the control unit 20 (step 403). The transponder unit 32 can be wirelessly supplied with power from the control unit 20. If the battery 31 is sufficiently charged, a check can also be carried out to determine whether a switch or a button of the electronic device 30 has been actuated by the user (step 404) within a specific time period before or after the receipt of the request signal. If this is the case, a response signal can be sent to the control unit 20 (step 403). However, if a switch or a button has not been actuated by the user within the specific time period before or after the receipt of the request signal, the process is interrupted and a response signal is not sent to the control unit 20 (step 405).

Another example of an access verification method is now described with reference to FIG. 5. Initially, the actuation of a switch or a button of the electronic device 30 can be detected (step 501). Thereafter, a check is carried out to determine whether a request signal of a control unit 20 has been received (step 502) within a specific time period after the actuation of the switch or the button. If this is the case, a response signal can be sent to the control unit 20 (step 503). If a request signal from the control unit 20 has not been received and a switch or a button of the electronic device 30 is actuated again (step 504), an appropriate signal can be sent from the electronic device 30 to the control unit 20, the signal triggering an unlocking of the vehicle 10 (step 505). A request signal from the vehicle 10 is not necessary in this case, since the desire of the user to unlock the vehicle 10 is unambiguously detected. If, however, a switch or a button of the electronic device 30 has not been actuated again and more than a predefined length of time has elapsed (timeout, step 506) since the first actuation of the switch or the button, the method is aborted and a signal is not sent to the control unit 20 (step 507).

The invention was described using the example of an access and start system for a vehicle 10. The vehicle 10 can be, for example, a passenger car, a truck, a bus, a tractor, an aircraft, a ship, or any other type of vehicle.

The described method can be utilized not only for access systems for vehicles, but also, for example, for electronic payment systems.

The invention claimed is:

1. An access system comprising a control unit arranged in a vehicle, and a portable electronic device, wherein:
   the portable electronic device comprises a battery, which is designed configured to supply various further components of the portable electronic device with power;
   the portable electronic device also comprises a transponder unit, configured to be wirelessly supplied with power by the control unit;
   the control unit is configured to send a request signal to the portable electronic device;
   the portable electronic device is configured to check, upon receipt of the request signal, whether supplying power by the battery is possible;
   the portable electronic device is also configured to provide a wireless power supply to the transponder unit by the control unit and to send a response signal to the control unit when supplying power by the battery is not possible; and
   the portable electronic device is also configured to send the response signal to the control unit when supplying power by the battery is possible and a switch or a button of the portable electronic device has been actuated by a user within a specific time period before or after the receipt of the request signal;
   wherein the vehicle is unlocked if the portable electronic device is recognized based on of the response signal as belonging to the vehicle.

2. The access system as claimed in claim 1, wherein the vehicle remains locked if the control unit does not receive the response signal or a valid response signal within a specific time period after sending of the request signal from the portable electronic device.

3. The access system of claim 2, wherein the control unit either
   emits request signals at regular intervals; or
   emits the request signal only in response to a triggering event.

4. The access system as claimed in claim 2, wherein the specific time period before or after the receipt of the request signal is a few seconds or a few minutes.

5. The access system as claimed in claim 2, wherein the portable electronic device is either a vehicle key, a mobile phone, a smartphone, a tablet, a smartwatch, a laptop, or a personal digital assistant.

6. The access system as claimed in claim 2, wherein the portable electronic device is either a vehicle key, a mobile phone, a smartphone, a tablet, a smartwatch, a laptop, or a personal digital assistant.

7. The access system of claim 1, wherein the control unit either
   emits request signals at regular intervals; or
   emits the request signal only in response to a triggering event.

8. The access system as claimed in claim 7, wherein the triggering event includes actuation of a door handle of the vehicle or detection of an approach by the portable electronic device to the vehicle.

9. The access system as claimed in claim 8, wherein the specific time period before or after the receipt of the request signal is a few seconds or a few minutes.

10. The access system as claimed in claim 8, wherein the portable electronic device is either a vehicle key, a mobile phone, a smartphone, a tablet, a smartwatch, a laptop, or a personal digital assistant.

11. The access system as claimed in claim 8, wherein the portable electronic device is either a vehicle key, a mobile phone, a smartphone, a tablet, a smartwatch, a laptop, or a personal digital assistant.

12. The access system as claimed in claim 7, wherein the specific time period before or after the receipt of the request signal is a few seconds or a few minutes.

13. The access system as claimed in claim 7, wherein the portable electronic device is either a vehicle key, a mobile phone, a smartphone, a tablet, a smartwatch, a laptop, or a personal digital assistant.

14. The access system as claimed in claim 7, wherein the portable electronic device is either a vehicle key, a mobile phone, a smartphone, a tablet, a smartwatch, a laptop, or a personal digital assistant.

15. The access system as claimed in claim 1, wherein the specific time period before or after the receipt of the request signal is a few seconds or a few minutes.

16. The access system as claimed in claim 15, wherein the portable electronic device is either a vehicle key, a mobile phone, a smartphone, a tablet, a smartwatch, a laptop, or a personal digital assistant.

17. The access system as claimed in claim 1, wherein supplying power by the battery is possible if state of charge of the battery exceeds a predefined limit value.

18. The access system as claimed in claim 1, wherein the portable electronic device is either a vehicle key, a mobile phone, a smartphone, a tablet, a smartwatch, a laptop, or a personal digital assistant.

19. A method for access verification in a vehicle, wherein the vehicle has an access system that comprises a control unit arranged in the vehicle, and a portable electronic device, wherein the portable electronic device comprises a battery and is configured to supply various components of the portable electronic device with power, wherein the portable electronic device comprises a transponder unit, which can be wirelessly supplied with power by the control unit, the method comprising:

emitting a request signal from the control unit to the portable electronic device;

upon receipt of the request signal, checking by the portable electronic device whether supplying power by the battery is possible;

if supplying power by the battery is not possible, providing a wireless power supply of the transponder unit by the control unit and sending a response signal from the portable electronic device to the control unit; and sending the response signal from the portable electronic device to the control unit when supplying power by the battery is possible and a switch or a button of the portable electronic device has been actuated by a user within a specific time period before or after the receipt of the request signal; and unlocking the vehicle if the portable electronic device is recognized based on the response signal as belonging to the vehicle.

20. A vehicle that has an access system that comprises a control unit arranged in the vehicle, and a portable electronic device, wherein:

the portable electronic device comprises a battery, which is configured to supply various further components of the portable electronic device with power;

the portable electronic device comprises a transponder unit, which can be wirelessly supplied with power by the control unit;

the control unit is configured to send a request signal to the portable electronic device;

the portable electronic device is configured to check, upon receipt of the request signal, whether a supplying power by the battery is possible;

the portable electronic device is also configured to provide a wireless power supply to the transponder unit by the control unit and to send a response signal to the control unit when supplying power by the battery is not possible; and the portable electronic device is also configured to send a response signal to the control unit when supplying power by the battery is possible and a switch or a button of the portable electronic device has been actuated by a user within a specific time period before or after the receipt of the request signal;

wherein the vehicle is unlocked if the portable electronic device is recognized as belonging to the vehicle based on the response signal.

\* \* \* \* \*